July 20, 1954 A. W. SPICER 2,684,315
TRANSMISSION BELT
Filed Oct. 15, 1952
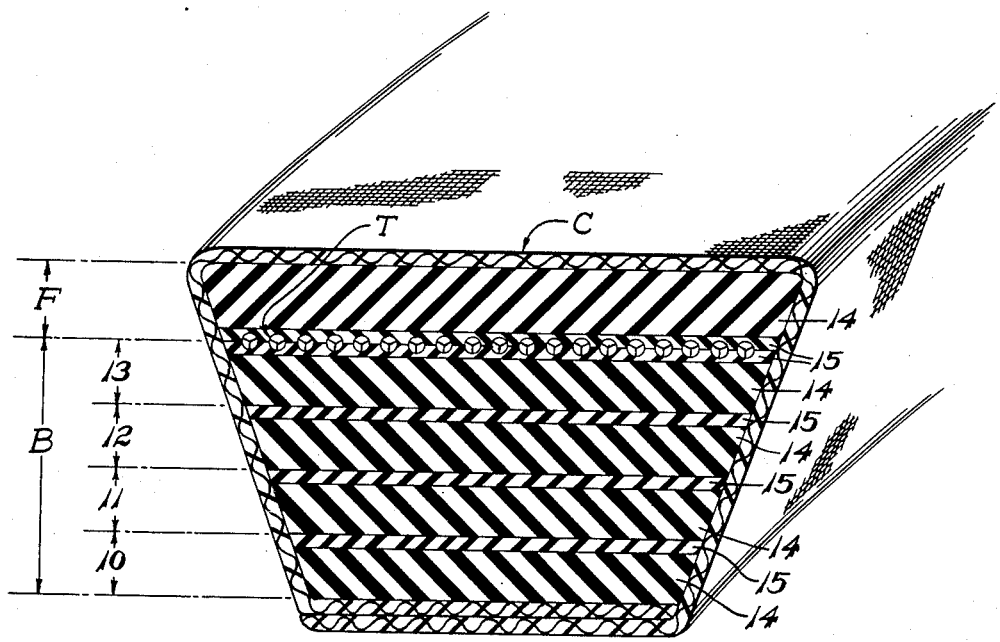
Inventor
Alvin W. Spicer
By C. E. Tripp Atty Patented July 20, 1954

2,684,315

UNITED STATES PATENT OFFICE 2,684,315

TRANSMISSION BELT

Alvin W. Spicer, Cuyahoga Falls, Ohio, assignor to The B. F. Goodrich Company, New York, N. Y., a corporation of New York Application October 15, 1952, Serial No. 314,787

5 Claims. (Cl. 154—52.2)

This invention relates to belts for transmission of power and more particularly to belts having a section of trapezoidal cross-section, commonly known as V-belts, of the type wherein the belt comprises a thin tension layer embedded in a body of rubber or rubber-like material.

As V-belts must necessarily have considerable thickness, they tend to be somewhat stiff, yet it is desirable that the belts be longitudinally flexible to increase belt life as well as to reduce losses of power due to bending friction. For this reason many V-belts are manufactured so as to locate the cord or other inextensible stretch-resisting elements of the belt at a neutral bending zone with the compression or base portion of the belt formed of deformable resilient rubber or similar material. Such a belt has a higher longitudinal flexibility than does one wherein the base portion includes fabric plies but since the base portion is relatively thick and since it must be stiff enough to carry the lateral loads imposed by the pulley walls, even the aforesaid construction presents problems due to resistance to longitudinal flexing. Of course the rubber of the base portion can be compounded so that it is quite soft or deformable but a belt so formed will be readily distorted and will not carry the required load.

The principal object of the invention resides in increasing the life of belts of the type referred to as well as reducing the frictional resistance of such belts in service, without sacrificing to any material degree the ability of the belt to resist lateral deformation. Briefly this is accomplished by forming the base portion of the belt with a number of plies, each ply comprising a layer or lamination of relatively stiff rubber such as rubber compounded with fillers or fibers and the like, and a thinner layer of what is known in the art as step-off or tie-gum rubber. This construction substantially maintains the lateral stiffness of the belt while permitting longitudinal flexing and relative displacement of the stiff rubber layers thereby providing a longitudinal flexibility considerably greater than that obtainable where the base portion is entirely composed of relatively stiff compounded rubber.

Another object of the invention resides in facilitating manufacture of such belts in that the aforesaid construction makes possible forming both the filler and the base plies from the same laminated stock. The manner in which these and other objects of the invention are attained will be apparent from the following description and from the accompanying drawing.

In the drawing, the figure represents a cross-sectional view of a belt formed in accordance with the invention.

Belts of the type to which this invention relates customarily include four basic portions, these being a tension portion T which is substantially longitudinally inextensible, an outer or filler portion F surrounding the tension portion, an inner or base portion B surrounded by the tension portion and a fabric cover C. The base portion B in the form shown comprises four plies 10, 11, 12 and 13, and the filler portion F in this form is likewise made up of a single ply or layer of the aforesaid plies, and in the preferred embodiment of this invention all plies are made from the same laminated stock. This stock consists of a relatively thick layer 14 of stiff load-carrying material, which is preferably compounded by calendering or otherwise mixing natural or synthetic rubber with a suitable filler. This layer or lamination is preferably compounded so as to present a Shore Durometer Scale A hardness of 85 or higher as determined by the service requirements of the belt. Laid over and temporarily bonded to the base layer 14 of the stock is a layer 15 of gum rubber, commonly referred to as tie-gum rubber in the V-belt art, and having Shore Durometer Scale A hardness of 65-80 when employed with the aforesaid base stock.

The belts may be built on a drum by superimposing the successive base plies 10, 11, 12 and 13 in such a manner that the tie-gum rubber is outermost on each ply. The tension ply T is then formed by wrapping or laying substantially inextensible material about the outermost layer 15 of the outer ply 13, which material in the preferred embodiment of the invention consists of endless cords or grommets that are placed or wrapped around the laminated base portion of the belt. The body proper of the belt is completed then, by laying the filler portion F so that it surrounds the tension portion of the cords or fabric with its tie-gum layer 15 contiguous with the corresponding layer of the outer ply 13. Thus the two tie-gum layers being back to back provide a bonding and cord receiving layer of ample thickness to entirely bond and receive such layers. If the belt is being built from a cylindrical assembly, as is common in the art, the cylinder will next be cut or otherwise divided so as to produce individual belt bodies and these will be covered with the usual square-woven fabric cover C. The uncured belts are then cured or vulcanized in suitable molds to bond all the plies thereof into an integral unit. It will be noted that the base portion of the belt being made up of alternate laminations of relatively hard and relatively soft rubber, which laminations extend longitudinally of the belt and also extend from side to side between the driving faces, is readily flexed in service as the belt passes around the usual pulleys. The thin layers of tie-gum in effect convert the belt into a laminated structure analogous to the familiar leaf spring of an automobile, which spring is readily flexed in response to radial loads, but which resists transverse loads substantially as efficiently as if the spring were made of a solid piece of metal. Thus with a belt built in accordance with the invention the incorporation of the relatively thin layers 15 of tie-gum does not substantially reduce the lateral stiffness of the belt but does substantially increase the facility with which the belt flexes in service with a corresponding increase in belt life. As an example, without imparting limitations to the claims, tests have been run under direction of applicant in order to obtain a comparison of the life of a belt formed in accordance with the invention, with the life of a similar belt wherein the base portion is (as has been customary) formed entirely of relatively stiff compounded rubber. A belt formed in accordance with the invention consisted of a single ply filler portion and a four-ply base portion. Each ply was made up of two layers, the layers 14 being .040" thick, compounded of natural rubber and rayon fibers, having a durometer hardness of somewhat more than 85. The tie-gum layers 15 were .008" thick and formed of standard gum rubber. The belt formed of these plies had a cover applied thereto and was vulcanized in accordance with the usual practice. The "control" belt was compounded of identical material except that the base portion consisted of a single thick layer of the compounded rubber and a single thin layer of tie gum rubber. The belts were placed about a pair of 3¼ O. D. pulleys which were separated so as to apply a 90 lb. tension on the belt. The driven pulley was retarded by a Prony brake adjusted to dissipate four H. P. In this test the pulleys were driven at 4000 R. P. M. The "control" belt referred to had a life of 210 hours under the particular test in question, whereas the belt made in accordance with the invention of identical materials had a life of 425 hours. An even longer life, i. e. 614 hours was attained by a belt wherein the tie-gum layers consisted of neoprene rubber. Despite the startling increase in belt life resulting from this invention the distortion of the belt due to lateral loads is unimpaired as compared to the distortion of the conventionally formed belts, thereby making apparent the distinct advantages of and contribution to the art represented by this invention.

It is to be understood in connection with the following claims that the term "rubber" or "rubber-like" material includes not only natural or tree-grown rubber, but also all suitable synthetic or man-made rubbers.

Variations may be made without departing from the scope of the invention as it is defined by the following claims.

I claim:

1. A V-belt having opposite side-driving faces, said belt comprising a tension portion having a relatively thin layer of substantially longitudinally inextensible material, a filler portion of rubber-like material surrounding said tension portion, and a base portion surrounded by said tension portion, said base portion comprising alternate laminations of relatively stiff and relatively soft deformable rubber-like material extending longitudinally of the belt with their margins at said side faces of the belt, all of said portions being vulcanized together.

2. A V-belt having opposite side-driving faces, said belt comprising a tension portion having a relatively thin layer of substantially longitudinally inextensible material, a filler portion of rubber-like material surrounding said tension portion, and a base portion surrounded by said tension portion, said base portion comprising laminations formed of compounded rubber alternating with laminations of softer rubber, said laminations extending longitudinally of the belt with their margins at said side faces of the belt, all of said portions being vulcanized together.

3. A V-belt having opposite side-driving faces, said belt comprising a tension portion having a relatively thin layer of substantially longitudinally inextensible material, a filler portion of rubber-like material surrounding said tension portion, and a base portion surrounded by said tension portion, said base portion comprising a plurality of plies each of which comprises a relatively thick layer of relatively stiff rubber-like material and a layer of relatively soft deformable rubber-like material, said layers extending longitudinally of the belt with their margins at said side faces of the belt, the plies of said base portion being arranged with the relatively soft layers radially outermost, said filler portion comprising a similar ply having its relatively soft layer contiguous to the soft layer of the radially outer base ply, said thin layer of inextensible material being embedded between said contiguous soft layers, all of said portions being vulcanized together.

4. A V-belt having opposite side-driving faces, said belt comprising a tension portion having a relatively thin layer of substantially longitudinally inextensible material, a single ply filler portion of rubber-like material surrounding said tension portion, and a multi-ply base portion surrounded by said tension portion, said plies each comprising a relatively thick layer of relatively stiff rubber-like material and a layer of relatively soft deformable rubber-like material, said layers extending longitudinally of the belt with their margins at said side faces of the belt, the plies of said base portion being arranged with the relatively soft layers radially outermost and the filler ply having its relatively soft layer contiguous to the soft layer of the radially outer base ply, said thin layer of inextensible material being embedded between said contiguous soft layers, all of said portions being vulcanized together.

5. A V-belt having opposite side-driving faces, said belt comprising a tension portion having a relatively thin layer of substantially longitudinally inextensible material, a single ply filler portion of rubber-like material surrounding said tension portion, and a multi-ply base portion surrounded by said tension portion, said plies each comprising a relatively thick layer of compounded rubber material and a thinner layer of gum rubber, said layers extending longitudinally of the belt with their margins at said side faces of the belt, the plies of said base portion being arranged with the gum rubber layers radially outermost and the filler ply having its gum rubber layer contiguous to the gum rubber layer of the radially outer base ply, said thin layer of inextensible material being embedded between said contiguous gum rubber layers, all of said portions being vulcanized together.

References Cited in the file of this patent

UNITED STATES PATENTS

| Number | Name | Date |
|---|---|---|
| 1,906,397 | Meyer | May 2, 1933 |
| 2,054,619 | Freedlander | Sept. 15, 1936 |
| 2,417,512 | Nassimbene | Mar. 18, 1947 |